(12) United States Patent
Alkhalifah et al.

(10) Patent No.: US 8,196,309 B2
(45) Date of Patent: Jun. 12, 2012

(54) METHOD AND APPARATUS FOR MEASURING DISTANCE ON A LOOSE SURFACE

(75) Inventors: Tariq Ali Alkhalifah, Thuwal (SA); Khaled Faraj Rashdan Almutairi, Riyadh (SA); Faisal Mojari Almotiri, Riyadh (SA)

(73) Assignee: King Abdul Aziz City for Science and Technology, Riyadh (SA)

( * ) Notice: Subject to any disclaimer, the term of this patent is extended or adjusted under 35 U.S.C. 154(b) by 31 days.

(21) Appl. No.: 12/871,717

(22) Filed: Aug. 30, 2010

(65) Prior Publication Data
US 2012/0047757 A1     Mar. 1, 2012

(51) Int. Cl.
*G01B 3/12*     (2006.01)
*G01C 22/00*    (2006.01)

(52) U.S. Cl. ............................................ 33/772; 33/773
(58) Field of Classification Search ............... 33/772, 33/779, 780, 781, 782, 773, 774, 775, 776, 33/777, 124
See application file for complete search history.

(56) References Cited

U.S. PATENT DOCUMENTS

| | | | | |
|---|---|---|---|---|
| 97,138 A * | 11/1869 | Von Schlagintweit et al. | . | 33/782 |
| 238,563 A * | 3/1881 | Brown | | 33/781 |
| 937,302 A * | 10/1909 | Harris | | 33/782 |
| 1,057,885 A * | 4/1913 | Roff | | 116/67 R |
| 1,291,485 A * | 1/1919 | Grover | | 33/782 |
| 1,835,804 A * | 12/1931 | Morra | | 33/781 |
| 1,942,130 A * | 1/1934 | Woodcock | | 33/782 |
| 2,325,130 A * | 7/1943 | Harmon | | 33/781 |
| 2,806,291 A * | 9/1957 | Robertson | | 33/776 |
| 3,006,273 A * | 10/1961 | Sommer | | 33/32.1 |
| 3,196,545 A * | 7/1965 | Zell et al. | | 33/782 |
| 3,577,918 A * | 5/1971 | Wayfield | | 101/328 |
| 3,696,510 A * | 10/1972 | Evans, Jr. | | 33/781 |
| 3,771,228 A * | 11/1973 | Culver | | 33/772 |
| 4,136,451 A * | 1/1979 | Briand et al. | | 33/772 |
| 4,532,710 A * | 8/1985 | Kinney et al. | | 33/772 |
| 5,749,522 A * | 5/1998 | Smrt | | 239/71 |
| 6,550,151 B2 * | 4/2003 | Airey et al. | | 33/320 |
| 7,536,805 B1 * | 5/2009 | Tang | | 33/782 |

* cited by examiner

Primary Examiner — Christopher Fulton

(57) ABSTRACT

A method and apparatus for measuring distance on a loose surface is disclosed. The apparatus includes a frame and a wheel operatively coupled to the frame. The wheel rotates relative to the frame. Further, the wheel includes a hub for operatively coupling the wheel with the frame. The hub rotates relative to the frame in response to one of pushing and pulling of the frame. To increase traction between the wheel and the loose surface, a plurality of spikes is provided on a peripheral surface of the wheel, projecting outwardly away from the hub. As the peripheral surface rolls on the surface, the distance traversed by the wheel is measured by calculating the number of rotations made by the wheel. A counter is operatively coupled to the wheel for tracking the number of rotations made by the wheel as the peripheral surface of the wheel rolls on the loose surface.

12 Claims, 3 Drawing Sheets

METHOD AND APPARATUS FOR
MEASURING DISTANCE ON A LOOSE
SURFACE

FIELD OF THE INVENTION

The present invention generally relates to measuring distance on a loose surface.

BACKGROUND OF THE INVENTION

A survey wheel is generally used in apparatuses for measuring distance. The survey wheel rolls on a surface on which distance is to be measured and number of rotations of the survey wheel is tracked to determine the distance traversed by the survey wheel on the surface.

However, if the surface is a loose surface, traction between the survey wheel and the loose surface is comparatively low. Examples of the loose surface include, but not limited to a sand dune surface, a gravel sediment surface, a free sand surface, a soft soil surface and a snow surface. Accordingly, when the survey wheel rolls on the loose surface, there is a tendency for the survey wheel to slip and thus reduce accuracy in the distance measured on the loose surface.

Therefore, there is a need for a wheel for measuring distances over a loose surface.

BRIEF DESCRIPTION OF THE FIGURES

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

Figure 1:
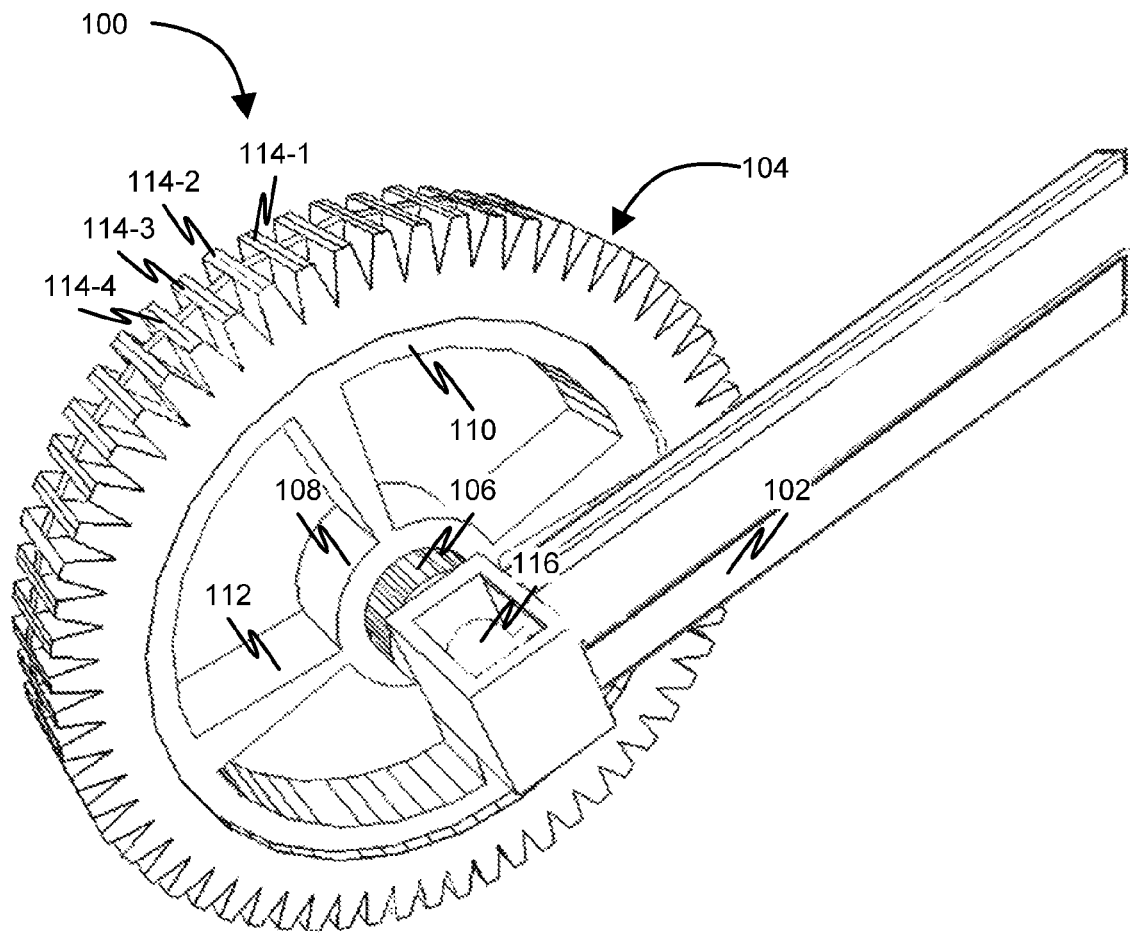
FIG. 1 illustrates a perspective view of an apparatus for measuring distance on a loose surface in accordance with an embodiment of the invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION OF THE INVENTION

Before describing in detail embodiments that are in accordance with the invention, it should be observed that the embodiments reside primarily in combinations of method steps and apparatus components related to method and apparatus for measuring distance over a loose surface. Accordingly, the apparatus components and method steps have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

Various embodiments of the invention provide an apparatus for measuring distance on a loose surface and a method thereof. Examples of a loose surface include, but not limited to a sand dune surface, a gravel sediment surface, a free sand surface, a soft soil surface and a snow surface. The apparatus includes a frame and a wheel operatively coupled to the frame. The wheel rotates relative to the frame. Further, the wheel includes a hub for operatively coupling the wheel with the frame. The hub rotates relative to the frame in response to one of pushing and pulling of the frame. To increase traction between the wheel and the loose surface, a plurality of spikes is provided on a peripheral surface of the wheel, projecting outwardly away from the hub. As the peripheral surface rolls on the surface, the distance traversed by the wheel is calculated using the number of rotations made by the wheel. Accordingly, a counter is operatively coupled to the wheel for tracking the number of rotations made by the wheel as the peripheral surface of the wheel rolls on the loose surface.

FIG. 1 illustrates an apparatus 100 for measuring distance on a loose surface in accordance with an embodiment of the invention. Apparatus 100 is moved on the loose surface by one of pushing and pulling a frame 102. In response to the one of pushing and pulling frame 102, a wheel 104 operatively coupled to frame 102 rotates relative to frame 102. Apparatus 100 includes a hub 106 for operatively coupling wheel 104 to frame 102. Thus, hub 106 enables wheel 104 to rotate relative to frame 102 and traverse on the loose surface. In an embodiment, wheel 104 includes an inner rim 108 of a first material fixedly attached to hub 106. Inner rim 108 rotates along with hub 106 while wheel 104 rolls over the loose surface. Further, an outer rim 110 of a second material is attached to a peripheral surface of inner rim 108 using two or more spokes 112-*n*.

To increase traction between wheel 104 and the loose surface, a plurality of spikes 114-*n* is provided on a peripheral surface of wheel 104. The plurality of spikes 114-*n* projects outwardly away from hub 106. The plurality of spikes includes, but is not limited to a spike 114-1, a spike 114-2, and spike 114-3. In an embodiment, the plurality of spikes 114-*n* is fixedly attached to the peripheral surface of wheel 104 and spikes of plurality of spikes 114-*n* is separated by a predefined distance.

As apparatus 100 is pulled or pushed using frame 102, wheel 104 rolls on the loose surface. Portions of one or more spikes of the plurality of the spikes 114-*n* sinks into the loose surface as the peripheral surface of wheel 104 rolls on the loose surface, thus providing better traction between wheel 104 and the loose surface. Wheel 104 along with the plurality of spikes is explained further in conjunction with FIG. 2.

In order to measure a distance traversed by wheel 104 on the loose surface, a number of rotations made by wheel 104 is tracked using a counter 116. Thereafter, a theoretical distance is calculated based on the number of rotations of wheel 104 tracked by counter 116. As portions of one or more spikes of plurality of spikes sink into the loose surface, an effective circumference of wheel 104 in contact with the loose surface is reduced. Therefore, in order to accurately measure the distance traversed by wheel 104, the theoretical distance measured using the number of rotations is required to be corrected based on the effective circumference of wheel 104. Accordingly, a predefined correction factor is determined to take into account the effective circumference for determining accurate distance. In an embodiment, the predefined correction factor for the loose surface is determined by rolling wheel 104 over a known distance on the loose surface. Thereafter, a theoretical distance is calculated based on a number of rotations made by wheel 104 while traversing the known distance. The predefined correction factor for the loose surface is determined as a ratio of the theoretical distance ($D_T$) and the known distance ($D_k$). Similarly, a predefined correction factor for another loose surface may be determined before actually measuring distance. For example, when the loose surface is a snow surface, wheel 104 with a diameter of 0.4 m ($d_w$) is rolled for a distance of 10 meters ($D_k$). Accordingly, counter 116 tracks 10 rotations (R) made by wheel 104 while traversing the distance of 10 meters on the snow surface. Therefore, the theoretical distance ($D_T$) is calculated as:

$$D_T = R \times (\pi d_w) = 10 \times (\pi \times 0.4) = 12.56 \text{ m}.$$

In this case, the predefined correction factor is the ratio of the theoretical distance ($D_T$) and the known distance ($D_k$) which is 1.256 (rounded off to third decimal place). Hence, the predefined correction factor for the snow surface is estimated to be 1.256. Accordingly, the predefined correction factor is used along with the theoretical distance calculated by counter 116 to calculate an actual distance traversed by wheel 104. In an embodiment, counter 116 is configured to calculate the predefined correction factor.

In an embodiment, counter 116 may further be configured to perform a predefined operation in response to wheel 104 traversing a predetermined distance. In another embodiment, counter 116 may perform the predefined operation in response to wheel 104 traversing for a predetermined time interval. The predefined operation may be for example, updating a user about a total distance traversed by wheel 104. In yet another embodiment, counter 116 is connected to one or more geo-physical data acquisition devices using one or more of a wired connection and a wireless connection. Examples of the wireless connection includes, but are not limited to a Bluetooth connection, an Infrared connection (IR) connection, a cellular network based connection and a packet data based wireless connection.

Figure 2:
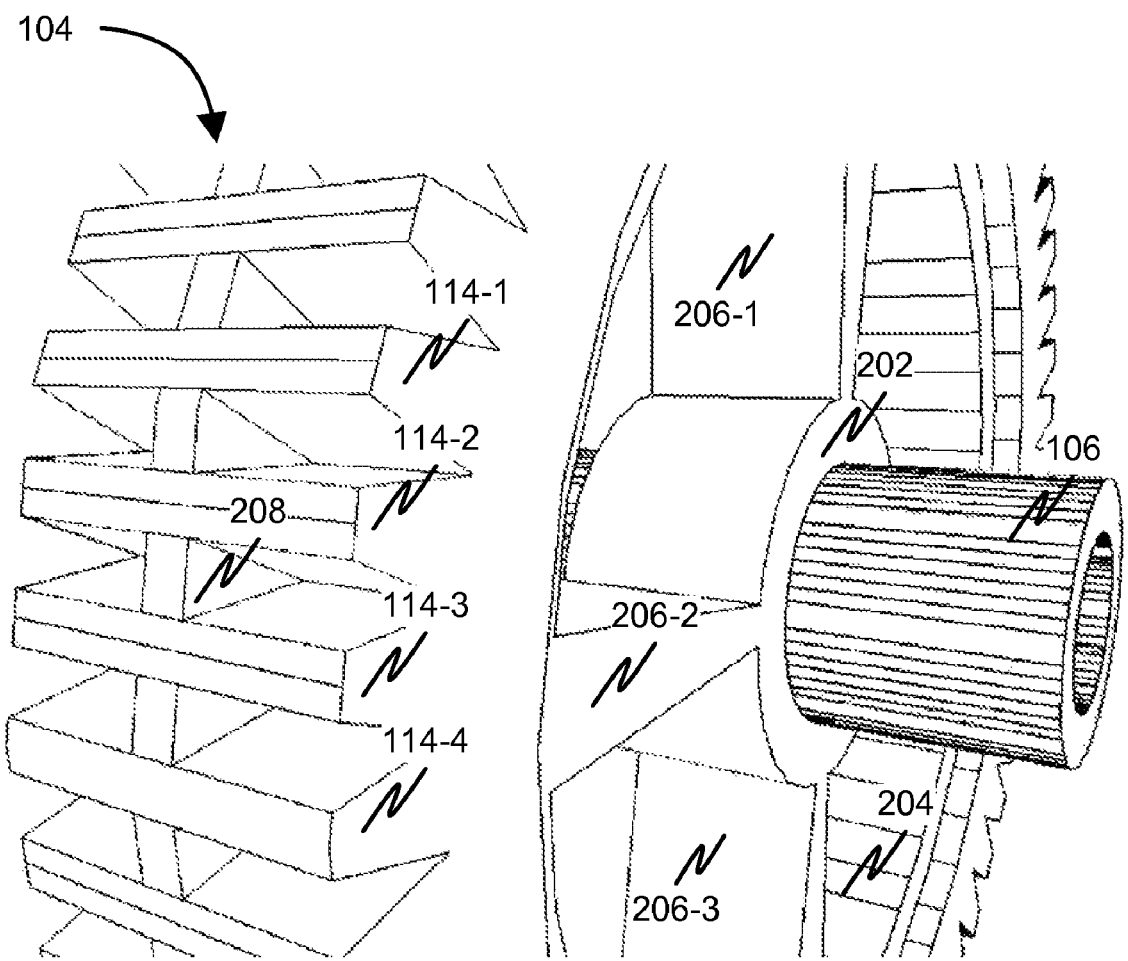
FIG. 2 illustrates a perspective view of a wheel for measuring distance on a loose surface using a distance measuring apparatus in accordance with an embodiment of the invention.

FIG. 2 illustrates a perspective view of wheel 104 for measuring distance on the loose surface using apparatus 100 (not shown in the figure) in accordance with an embodiment. Wheel 104 includes hub 106 used for operatively coupling wheel 104 to apparatus 100. Fixedly attached to hub 106, is an inner rim 202 of a first material and inner rim 202 rotates along with hub 106. Further, an outer rim 204 is attached to a peripheral surface of inner rim 202 using plurality of spokes 206-$n$. Plurality of spokes 206-$n$ includes, but not limited to, a spoke 206-1, a spoke 206-2, and a spoke 206-3. To increase traction between wheel 104 and the loose surface, plurality of spikes 114-$n$ is provided projecting outwardly from a peripheral surface of outer rim 204. Plurality of spikes 114-$n$ on the peripheral surface of outer rim 206 includes, but not limited to, a spike 114-1, a spike 114-2, a spike 114-3 and a spike 114-4. Portions of one or more spikes of the plurality of spikes sink into the loose surface, thus providing an increased traction between wheel 104 and the loose surface. In an embodiment, the portions of one or more spikes of plurality of spikes 114-$n$ sinking into the loose surface are measured. The measured portions of the one or more spikes sunk into the loose surface may be used to calculate a predefined correction factor corresponding to the loose surface. The predefined correction factor is used along with a number of rotations made by wheel 104 while traversing a distance to calculate the distance. In case wheel 104 traverses on a first loose surface for a first interval of time and on a second loose surface for a second interval of time, a first set of measured portions of the one or more spikes sinking into the first surface is different from a second set of measured portions of the one or more spikes sinking into the second surface. Accordingly, the predefined correction factor is separately calculated for the first loose surface and the second loose surface.

Further, the second loose surface may have soil characteristics different from the first loose surface. For example, the first loose surface may be a free sand surface and the second loose surface may be a gravel sediment surface. Accordingly, when wheel 104 traverses on the free sand surface, the plurality of spikes provides increased traction between wheel 104 and the free sand surface. However, when wheel 104 traverses on the gravel sediment surface, apparatus 100 may observe uneven rotations due to plurality of spikes 114-$n$. Therefore, a uniform surface may be required on wheel 104 for enabling wheel 104 to traverse evenly on the gravel sediment surface as the gravel sediment surface has substantially harder soil characteristics. Accordingly, an annular hoop member 208 is fixedly attached on the peripheral surface of wheel 104 as illustrated in FIG. 2. Annular hoop member 208 provides the uniform surface, thus enabling wheel 104 to traverse on the gravel sediment surface with the substantially harder soil characteristics. In an embodiment, one or more annular hoop members are fixedly attached on the peripheral surface of wheel 104.

Figure 3:
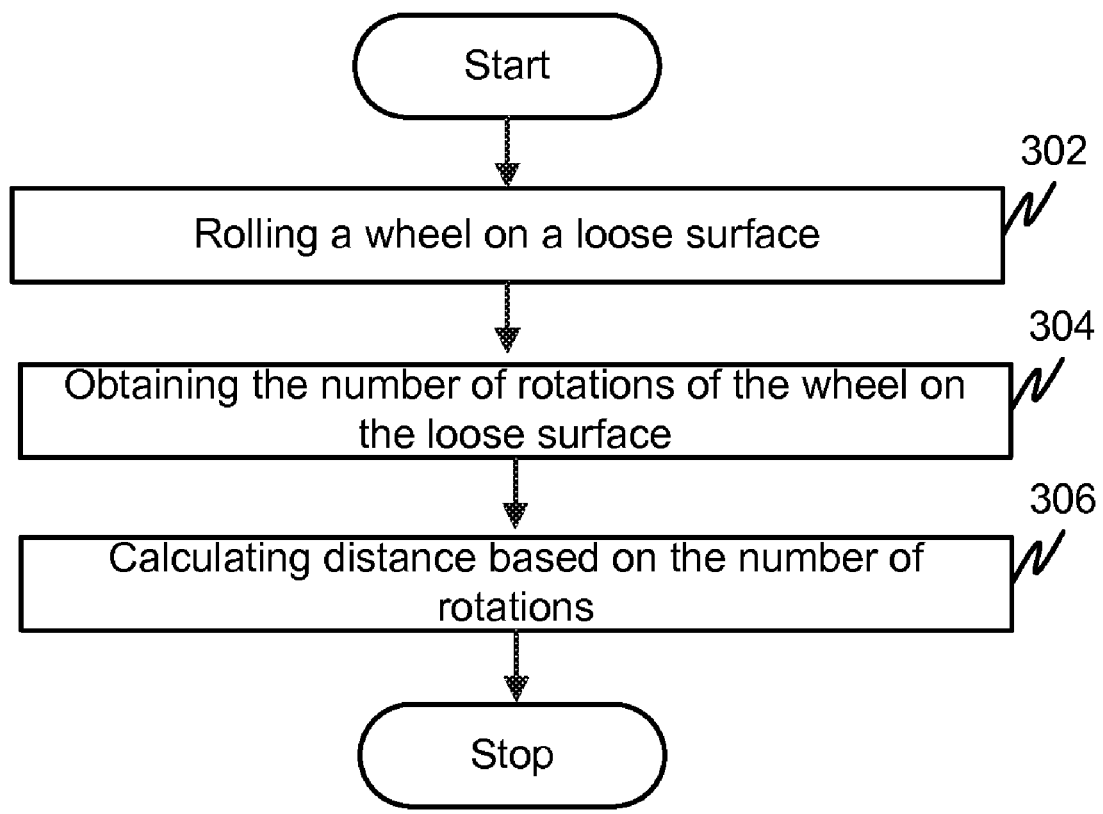
FIG. 3 illustrates a flow diagram for measuring distance on a loose surface using a distance measuring apparatus in accordance with an embodiment of the invention.

FIG. 3 illustrates a flow diagram for measuring distance on a loose surface using a distance measuring apparatus. The distance measuring apparatus includes a frame for moving the distance measuring apparatus by one of pushing and pulling the frame. In response to the one of pushing and pulling the frame, a wheel in the distance measuring apparatus rotates relative to the frame along with a hub. The hub operatively couples the wheel to the frame. For providing better traction between the wheel and the loose surface, a plurality of spikes is fixedly attached to a peripheral surface of the wheel such that the plurality of spikes projects outwardly away from the hub. Accordingly, when the wheel rolls over the loose surface, the distance is measured on the loose surface based on a number of rotations made by the wheel.

In order to measure distance, the wheel is rolled on the loose surface at step 302 as illustrated in FIG. 3. Thereafter, the number of rotations of the wheel is obtained from a counter provided with the wheel. The counter tracks the number of rotations of the wheel at step 304 as the peripheral surface of the wheel rolls on the loose surface. Subsequently, the distance traversed by the wheel on the loose surface is calculated at step 306 based on the number of rotations of the wheel. In an embodiment, the distance is calculated based on a predefined correction factor corresponding to the loose surface. The predefined correction factor may be proportional to a portion of a spike that sinks into the loose surface. Alternatively, the predefined correction factor may be determined by rolling the wheel over a known distance on the loose surface. The predefined correction factor is calculated as a ratio of a theoretical distance calculated based on the number of rotations and the know distance. For example, a wheel with a diameter of 0.4 m ($d_w$) is rolled on the loose surface for a distance of 10 meters ($D_k$) and the counter tracks 10 rotations (R) made by the wheel while traversing the distance of 10 meters on the loose surface. Accordingly, the theoretical distance ($D_T$) is calculated as:

$$D_T = R \times (\pi d_w) = 10 \times (\pi \times 0.4) = 12.56 \text{ m}.$$

In this case, the predefined correction factor is the ratio of the theoretical distance ($D_T$) and the known distance ($D_k$) which is 1.256 (rounded off to third decimal place). Hence, the predefined correction factor for the loose surface is estimated to be 1.256. The predefined correction factor is used along with the theoretical distance calculated by counter 116 to calculate an actual distance traversed by the wheel.

Various embodiments of the invention provide methods and an apparatus for measuring distance on a loose surface. Accuracy of the distance measured on the loose surface depends on traction between a wheel in the apparatus and the loose surface. Accordingly, a plurality of spikes on a peripheral surface of the wheel provides increased traction between the wheel and the loose surface, thus providing an increased accuracy in the distance measured by the apparatus. An annular hoop member on the peripheral surface of the wheel enables a user to roll the wheel on a first loose surface and a second loose surface to accurately measure distances on the first loose surface and the second loose surface.

Those skilled in the art will realize that the above recognized advantages and other advantages described herein are merely exemplary and are not meant to be a complete rendering of all of the advantages of the various embodiments of the present invention.

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of the present invention. The benefits, advantages, solutions to problems, and any element(s) that may cause any benefit, advantage, or solution to occur or become more pronounced are not to be construed as a critical, required, or essential features or elements of any or all the claims. The present invention is defined solely by the appended claims including any amendments made during the pendency of this application and all equivalents of those claims as issued.

What is claimed is:

1. An apparatus for measuring distance on a loose surface, the apparatus comprising:
    a frame;
    a wheel operatively coupled to the frame, wherein the wheel rotates relative to the frame, the wheel comprising:
        a hub for operatively coupling the wheel to the frame, wherein the hub rotates relative to the frame in response to one of pushing and pulling of the frame; and
        a plurality of spikes projecting outwardly from a peripheral surface of the wheel in a direction away from the hub; and
    a counter operatively coupled to the wheel, wherein the counter tracks a number of rotations of the wheel as the peripheral surface of the wheel rolls on the loose surface thereby measuring distance traversed by the wheel on the loose surface and calculates the distance on the loose surface based on a predefined correction factor corresponding to the loose surface, the predefined correction factor being proportional to a portion of a spike of the plurality of spikes that sinks into the loose surface.

2. The apparatus of claim 1, wherein the wheel further comprising:
    an inner rim of a first material fixedly attached to the hub, wherein the inner rim rotates with the hub; and
    an outer rim of a second material fixedly attached to a peripheral surface of the inner rim using a plurality of spokes.

3. The apparatus of claim 1, wherein the counter is further configured to perform a predefined operation in response to the wheel traversing at least one of a predetermined distance and for a predetermined time interval, wherein the predefined operation is updating a total distance traversed by the wheel to a user.

4. The apparatus of claim 1, wherein spikes of the plurality of spikes fixedly attached to the peripheral surface of the wheel are separated by a predefined distance.

5. The apparatus of claim 4, wherein the wheel comprises at least one annular hoop member, at least a portion of the at least one annual hoop member spanning between adjacent spikes.

6. The apparatus of claim 5, wherein at least one surface of the least one annular hoop member extends between outwardly projected surfaces of the adjacent spikes.

7. The apparatus of claim 1, wherein the wheel comprises at least one annular hoop member, the annular hoop member being fixedly attached on the peripheral surface of the wheel.

8. The apparatus of claim 7, wherein at least one of the wheel and the annular hoop member is composed of one of a fiber material, a polymer based material, a metal and an alloy of one or more metals.

9. The apparatus of claim 7, wherein at least one surface of the least one annular hoop member extends between outwardly projected surfaces of the adjacent spikes.

10. The apparatus of claim 1, wherein the wheel is configured to traverse at least one of a sand dune surface, a gravel sediment surface, a free sand surface, a soft soil surface and a snow surface.

11. A method for measuring distance on a loose surface using a distance measuring apparatus, the distance measuring apparatus comprising:
    a frame;
    a wheel operatively coupled to the frame, wherein the wheel rotates relative to the frame, the wheel comprising:
        a hub for operatively coupling the wheel to the frame, wherein the hub rotates relative to the frame in response to one of pushing and pulling of the frame; and
        a plurality of spikes projecting outwardly from a peripheral surface of the wheel in a direction away from the hub; and
    a counter operatively coupled to the wheel, wherein the counter tracks a number of rotations of the wheel as the peripheral surface of the wheel rolls on the loose surface, the method for measuring the distance on the loose surface comprising:
        rolling the wheel on the loose surface;
        obtaining a number of rotations of the wheel on the loose surface as the peripheral surface of the wheel rolls on the loose surface; and
        calculating the distance traversed by the wheel on the loose surface based on the number of rotations of the wheel and on a predefined correction factor corresponding to the loose surface, the predefined correction factor being proportional to a portion of a spike of the plurality of spikes that sinks into the loose surface.

12. The method of claim 11, wherein the loose surface is at least one of a sand dune surface, a gravel sediment surface, a free sand surface, a soft soil surface and a snow surface.

* * * * *